C. E. BURDETTE.
AUTOMATIC FOUNTAIN.
APPLICATION FILED APR. 17, 1907.
997,268.
Patented July 11, 1911.
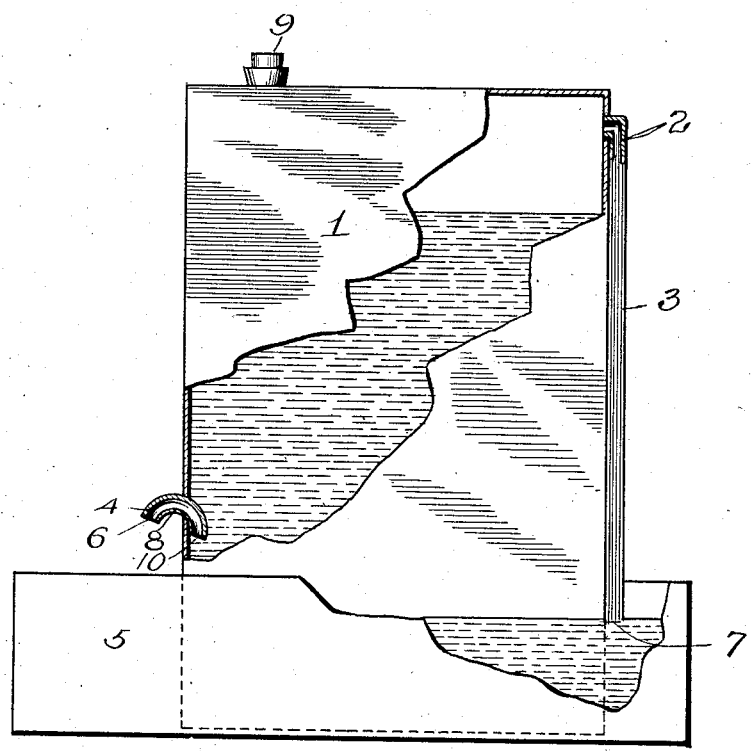
Witnesses
Harry R. L. White
Ray White
Inventor
Charles E. Burdette
By John W. Burdette
Atty

UNITED STATES PATENT OFFICE.

CHARLES E. BURDETTE, OF LONG MEADOW TOWNSHIP, HAMPDEN COUNTY, MASSACHUSETTS.

AUTOMATIC FOUNTAIN.

997,268.  Specification of Letters Patent.  Patented July 11, 1911.

Application filed April 17, 1907. Serial No. 368,792.

*To all whom it may concern:*

Be it known that I, CHARLES E. BURDETTE, residing in the township of Long Meadow, in the county of Hampden and State of Massachusetts, have invented a new and useful Improvement in Automatic Fountains; and I hereby declare the following to be a clear and exact description of the said invention, such as will enable others skilled in the art to which it appertains to make and use the same.

My invention relates to that class of devices which furnish an automatically-regulated supply of liquid. A familiar use of such a device is that of supplying drinking-water for poultry and livestock. In such devices as at present constructed the opening through which the contents of the reservoir are discharged into the receptacle for consumption, as, for instance, a drinking-trough, is so situated that there is permitted at all times free communication between the contents of the reservoir and the receptacle, the liquid in both constituting a single body maintained at different levels, so that when the liquid in the receptacle becomes foul, the defilement finds its way readily into the reservoir and the whole contents thereof become similarly defiled.

My invention prevents the contamination of the liquid in the reservoir by constituting two distinct and separate bodies of liquid, so that the contents of the reservoir cannot be contaminated by anything that may find its way into the liquid in the receptacle.

My invention consists in the novel construction and arrangement of the parts of the device as hereinafter fully described and set forth in this specification and claim.

The single figure constituting the drawings accompanying this application shows in elevation a reservoir and receptacle to which my device is applied, parts being broken away to expose portions of the interior of the reservoir and of the receptacle respectively, as shown.

Referring to the numerals on the drawing, 1 is a reservoir, which may be any vessel capable of being hermetically sealed, regardless of size, form or material. A pipe 3, having an opening, 2, near or at the top of the reservoir, adapted to form an air-duct which extends downward to, and opens at, a point, 7, externally of said reservoir and within the receptacle, 5, which is adapted to retain the liquid for consumption. A tube, 4, is inserted through the wall of the reservoir at any point at such an elevation or in such a position that the externally-open end, 6, thereof, shall be higher than the opening, 7, in the air-duct, and so located that liquid discharged there-through will fall into said receptacle, or into a conduit leading thereto. Said tube is formed in an arch and is so disposed that the limb thereof within the reservoir shall be longer than the limb without said reservoir and the end, 10, of the limb within said reservoir, shall be lower than the lowest point, 8, of the under side of the crown of the arch, said tube being adapted by reason of such construction to form a water seal and operate automatically to exclude the air and permit the outflow of liquid in the operation of the device.

The operation of this device is obvious. The reservoir may be filled through the tube, 4, or through the air-duct, 3, or, if desired, an opening may be provided especially for that purpose, preferably in the top of the reservoir as shown at 9. When not in use this opening must be hermetically sealed, for which purpose any suitable means may be used, and while it is open for the purpose of filling the reservoir the tube, 4, must be kept sealed by any suitable means. When filled the reservoir is so set that the lower opening, 7, in the air-duct, is within the receptacle, 5, said receptacle being empty. Air enters the reservoir through the air-duct and liquid escapes through the tube into the receptacle until the surface of the liquid thus discharged rises in the receptacle to the level of the said lower opening, 7, of the air-duct, which it seals, and the discharge of liquid from the reservoir ceases. When the surface of the liquid in the receptacle is reduced below the said lower and external opening, 7, in the air-duct, air again enters there-through into the reservoir and the same operation is repeated.

It is obvious that this invention may be applied in divers forms. The air-duct may be extended, and may enter the reservoir through the top. It may be constructed within the reservoir having its lower and external opening through the bottom thereof into the receptacle, in which case supports beneath the reservoir would be required to raise it above the bottom of the receptacle and permit the admission of air into the reservoir and the accumulation of liquid in the receptacle. The air-duct may be a pipe, or a flexible tube, and may be extended into a receptacle located at a distance from the reservoir, in which case the tube, 4, would, necessarily, be supplemented by a conduit suitable for the purpose, through which the liquid discharged through the tube would be conveyed to the same receptacle.

I claim:

In combination with a receptacle for supplying liquid for consumption a reservoir hermetically sealed, a pipe opening within said reservoir at or near the top thereof, and, also, at a lower point without said reservoir and within said receptacle, an arch-shaped tube inserted through the wall of said reservoir below the normal water-level therein and having its external orifice higher than the opening of said pipe within said receptacle, and having its internal orifice lower than the lower line of the crown of its arch, substantially as and for the purpose shown and described.

CHARLES E. BURDETTE.

Witnesses:
F. E. CARPENTER,
EDWIN SMITH.

Copies of this patent may be obtained for five cents each, by addressing the "Commissioner of Patents, Washington, D. C."